United States Patent
Langos et al.

(10) Patent No.: US 6,923,636 B2
(45) Date of Patent: Aug. 2, 2005

(54) BLOW MOLDING MACHINE

(75) Inventors: Peter Langos, St. Augustin (DE); Wolfgang Hamlischer, Remscheid (DE); Johannes Geilen, Windhagen (DE); Markus Holbach, Bornheim (DE); Wolfgang Schmitt, St. Augustin (DE); Erich Kiefer, Bonn (DE); Karsten Friedrichs, Bad Honnef (DE); Olaf Weiland, Hamburg (DE)

(73) Assignees: Mauser-Werke GmbH & Co. KG, Brühl (DE); Kautex Maschinenbau GmbH, Bonn-Holzlar (DE)

(*) Notice: Subject to any disclaimer, the term of this patent is extended or adjusted under 35 U.S.C. 154(b) by 19 days.

(21) Appl. No.: 10/144,682

(22) Filed: May 13, 2002

(65) Prior Publication Data

US 2003/0017229 A1 Jan. 23, 2003

Related U.S. Application Data

(63) Continuation of application No. PCT/EP00/08792, filed on Sep. 8, 2000.

(30) Foreign Application Priority Data

Nov. 11, 1999 (DE) ........................................ 299 19 885

(51) Int. Cl.[7] .............................................. B29C 49/56
(52) U.S. Cl. ..................... 425/214; 425/451.9; 425/541
(58) Field of Search .............................. 425/214, 541, 425/451.9; B29C 49/56

(56) References Cited

U.S. PATENT DOCUMENTS

| | | | | |
|---|---|---|---|---|
| 3,924,987 A | * | 12/1975 | Mehnert | ..................... 425/541 |
| 4,702,688 A | | 10/1987 | Schenk | ..................... 425/451.9 |
| 4,929,165 A | | 5/1990 | Inaba et al. | |
| 4,990,084 A | | 2/1991 | Reinhart | |
| 5,478,229 A | * | 12/1995 | Kato et al. | ................... 425/541 |
| 5,547,367 A | * | 8/1996 | Stein | ........................ 425/451.9 |
| 5,720,918 A | * | 2/1998 | Wollschlager et al. | ...... 425/541 |
| 5,962,039 A | * | 10/1999 | Katou et al. | ................. 425/541 |
| 5,975,881 A | * | 11/1999 | Langos et al. | .............. 425/541 |
| 6,102,685 A | * | 8/2000 | Miura et al. | ................. 425/541 |

(Continued)

FOREIGN PATENT DOCUMENTS

| | | |
|---|---|---|
| DE | 1 604 575 | 11/1970 |
| DE | 34 16 871 C2 | 9/1990 |

(Continued)

OTHER PUBLICATIONS

"ISW Forschung und Praxis", Berichte aus dem Institut für Steuerungstechnik der Werkzeugmaschinen und Fertigungseinrichtungen der UNI Stuttgart, Prof. Dr. Ing. Dres. Hc. G. Pritschow, vol. 127, SPIN: 10716378, ISBM 3–540–65634–0 ,Springer–Verlag Berlin, 1999.

*Primary Examiner*—Robert B. Davis
(74) *Attorney, Agent, or Firm*—Henry M. Feiereisen

(57) ABSTRACT

A blow-molding machine for producing blow-molded hollow bodies from a thermoplastic material, includes two blow-mold halves which can be horizontally displaced and provided with separate drive units for a transport drive and for the sequence of movements of the mold closing and locking device to open and close the blow mold halves. Conventional blow-molding machines are still equipped with hydraulic drives at least for the mold closing and locking device. In order to provide a blow-molding machine that can for example be operated under clean-room conditions, the drive unit of the blow-molding machine according to the invention is configured for the clamping elements of the mold closing and locking device as an electromotive direct drive with a spindle drive and a spindle mechanism with recirculating rollers.

16 Claims, 3 Drawing Sheets

U.S. PATENT DOCUMENTS

| | | | |
|---|---|---|---|
| 6,186,770 B1 * | 2/2001 | Ziv-Av | 425/451.9 |
| 6,224,367 B1 * | 5/2001 | Maier | 425/451.9 |
| 6,334,768 B1 * | 1/2002 | Looije et al. | 425/541 |
| 6,544,026 B1 * | 4/2003 | Stocksiefen | 425/214 |

FOREIGN PATENT DOCUMENTS

| | | | | |
|---|---|---|---|---|
| DE | 44 43 195 A1 | 6/1996 | | |
| DE | 197 47 698 A1 | 5/1998 | | |
| DE | 19909307 A1 * | 9/1999 | | B29C/45/58 |
| DE | 199 32 741 A1 | 1/2001 | | |
| EP | 0 544 903 A1 | 6/1993 | | |
| EP | 0 933 181 A2 | 8/1999 | | |
| EP | 983832 A1 * | 3/2000 | | B29C/33/22 |
| EP | 1 075 919 A2 | 2/2001 | | |
| JP | 10193445 | 7/1998 | | |
| JP | 10193445 A * | 7/1998 | | B29C/49/56 |
| JP | 11028747 | 2/1999 | | |
| JP | 2000218685 A * | 8/2000 | | B29C/49/56 |

* cited by examiner

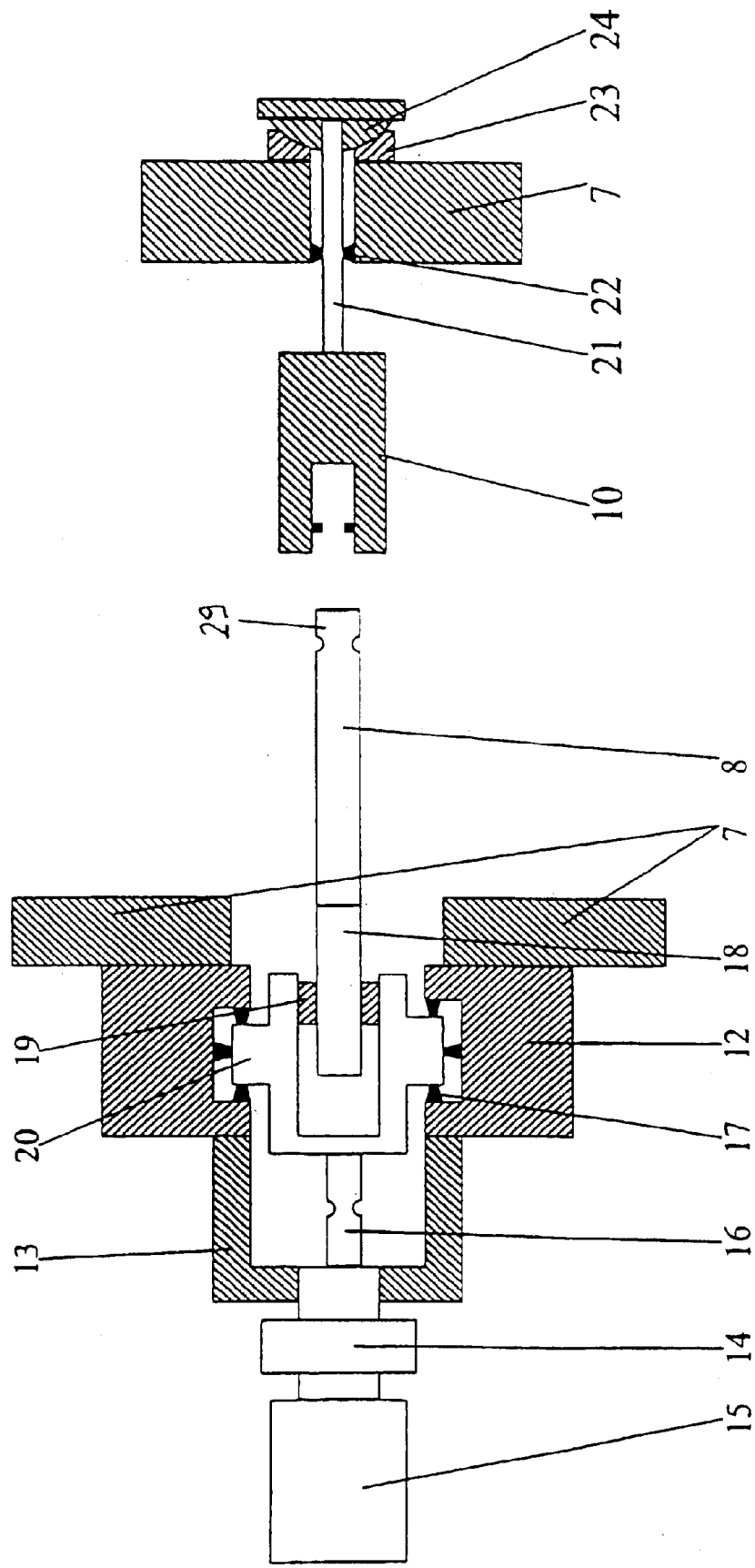

BLOW MOLDING MACHINE

CROSS-REFERENCES TO RELATED APPLICATIONS

This application is a continuation of prior filed copending PCT International application no. PCT/EP00/08792, filed Sep. 8, 2000.

This application claims the priority of German Patent Application Ser. No. 299 19 885.5, filed Nov. 11, 1999, pursuant to 35 U.S.C. 119(a)–(d), the subject matter of which is incorporated herein by reference.

BACKGROUND OF THE INVENTION

The present invention relates to a a blow molding machine for making blow-molded hollow bodies of thermoplastic material, having two blow mold halves traveling horizontally and equipped with separate drive units for the transport drive and for the movement sequences of the mold closing and locking device in order to implement an opening and closing of the blow mold halves.

A blow molding machine of the construction involved here is disclosed, for example, from the printed publication DE 34 16 871 C2 (to Mauser). The separate drives of this conventional blow molding machine are of hydraulic configuration for the motive drive as rapid transport (rapid motion) for a quick article withdrawal and for the closing drives (power drives) for the locking and clamping of the blow mold halves. The rodless construction of this blow mold machine, which has been built frequently in the last 15 years, proved very successful. However, when special applications are involved such as, e.g., a production under clean room conditions, the use of hydraulic drives is not good enough.

It would therefore be desirable and advantageous to provide an improved mold closing and locking device for a modern blow mold machine to obviate prior art shortcomings and to lock the mold mounting plates and blow mold halves, respectively.

SUMMARY OF THE INVENTION

According to one aspect of the present invention, a blow molding machine for making blow-molded hollow bodies of thermoplastic material, includes a frame structure having two blow mold halves; a first drive assembly for moving the blow mold halves in a horizontal direction between an opening position and a closing position; a mold closing and locking unit for clamping the blow mold haves in the closed position; and a second drive assembly for operating the mold closing and locking unit to implement a release and clamping of the blow mold halves, said second drive assembly constructed as electromotive direct drive.

Compared to conventional constructions, the blow mold machine according to the present invention accomplishes the following advantages:

- lower energy consumption compared to a blow mold machine with hydraulic drive,
- greater oil flows in view of greater cylinder surfaces and resultant great paths are avoided,
- better maintenance costs, because, for example, there is no need to replace hydraulic oil after maintenance intervals,
- lower noise development,
- higher flexibility and control capability of the movements,
- better repeating accuracy (no warm-up period) and
- suitability for clean room production, because there is, e.g., no risk of oil leakage.

According to another feature of the present invention, the manufacture of substantially rotationally symmetrical hollow bodies is realized by providing at least two clamping elements with electric direct drive secured in symmetric relationship laterally next to the blow mold halves or to the mold mounting plates or to frame parts connected therewith, whereas the manufacture of technical blow molded parts or substantially rotationally asymmetrical hollow bodies is realized by providing at least three closing elements with electric direct drive secured in asymmetric relationship laterally next to the blow mold halves or to the mold mounting plates or to frame parts connected therewith. Each closing element of the mold closing and locking device includes hereby an active and a passive half which can be coupled to one another approximately in the plane of the blow partition seam, wherein the direct drive disposed on the active half for implementing the closing and locking of the blow mold halves is constructed as electric spindle drive, preferably with trapezoidal thread.

The blow mold machine according to the invention with separate drive units for the transport drive (=driving mode-rapid motion without particular force application) and for the movement sequences of the mold closing and locking device (with great force application) is further characterized by the following features which can be combined in advantageous manner:

the mold closing and locking device for blow molds for production of large-volume hollow bodies, such as, e.g., 220 liters plastic drums, includes four or more identical closing elements attached in symmetric relationship laterally next to the blow mold halves or laterally to the mold mounting plates, a force storing device is associated to the mold closing and locking device for maintaining a pre-tension acting in opposition to the blowing pressure, when the blow mold halves are locked, the force storing device is implemented by spring element assemblies, the force storing device is constructed by predetermined elastically deformable regions of the mold mounting plates or of the frame plates arranged in parallel relationship therebehind, each closing element of the mold closing and locking device is provided with an electric spindle drive for the closing and locking of the blow mold, whereby the spindle drive is configured as spindle mechanism with recirculating rollers, namely a.) with shiftable spindle, or b.) with non-rotatably supported spindle, wherein the recirculating roller-supported nut is driven by a motor so as to be shiftable along the spindle, the recirculating roller-supported nut (e.g. in a bearing ring) is respectively fixed to a blow mold half or mold mounting plate and elastically supported in such a way, e.g., by a "floating support", that angle deviations, caused by the spindle or in cooperation with the coupling, can be equalized, or bending stress resulting from the deformation of the mold mounting plates can be compensated, the rotatable recirculating roller-supported nut is supported in an elastic-hinged manner and connected by a compensating coupling with the motor or its gear mechanism, the counterpiece of the closing elements, which can be coupled with the opposite spindle, is supported by the respectively opposing blow mold half or mold mounting plate also in a flexible manner, these particular elastic supports of the closing elements compensate angle errors as a consequence of bending, temperature influence or the like, the support is comprised of a ball socket and an elastic support element disposed therein, whereby the support element acts, at a spatial distance to the ball socket, between ball socket and coupling element, to maintain the spindle in the central position, the support element is made of an elastically deformable plastic ring (e.g. teflon) so as to protect the bearing with recirculating rollers, which normally reacts very sensitively to angle errors, from increased wear, the electric drive motor includes a locking brake or a brake is disposed in the drive train to the nut-spindle mechanism and so configured as to engage when the blow mold halves occupy the closed, pre-tensioned state so that no steady energy supply for the force-intensive clamping action is required, and the drive motor is a servomotor which generates a sufficiently high torque for clamping the blow mold halves (e.g. also without spring load), when the blow mold is closed.

According to another feature of the blow mold machine of the invention, it is provided that the transport drive for closing and opening the blow mold halves is also equipped with an electromotive direct drive, the transport drive is equipped with a single-piece spindle having a left-hand and a right-hand threaded section and rotatably driven by the electric drive for opposite movement of the blow mold halves, the transport drive for each blow mold half is equipped with a spindle having a nut-thread mechanism, whereby each spindle or each threaded nut can be driven by a separate motor, the transport drive is constructed in the form of a revolving chain, toothed belt, wire cable or the like elements, guided about two deflection wheels, and each blow mold half is connected directly or indirectly with one of the opposite strands (tension elements).

Compared to conventional hydraulic drives, the blow mold machine according to the invention with electric direct drives offers a considerably enhanced repeating accuracy for defined travel points; the machine has a high flexibility and is ready for immediate use in view of the quick stabilization of the operating state, as there is no need for a start-up period and run-off phase. There are no thermal energy losses and substantially no energy consumption is encountered during the crucial operating phase, namely the force-intensive clamping of the blow mold halves. This is advantageously realized by the brake of the drive motor and the spring assembly. The brake restrains the drive motor in the clamping position so that there is no need to apply an electric torque (no electric energy consumption), the spring assemblies oppose the blowing pressure and prevent an expansion of the blow mold halves. The advantageous roller guides or linear guidance system with recirculating balls ensure a high efficiency of above 70% at slight losses. In contrast thereto, a hydraulic machine requires always a warm-up period as a consequence of the temperature-dependency of the hydraulic oil, and heat has to be carried off constantly, thereby causing thermal energy losses.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 3 is a principal depiction of a closing element of a closing unit on an active side of the blow molding machine;

FIG. 4 is a principal depiction of a closing element of a closing unit on a passive side of the blow molding machine.

DETAILED DESCRIPTION OF PREFERRED EMBODIMENTS

Figure 1:
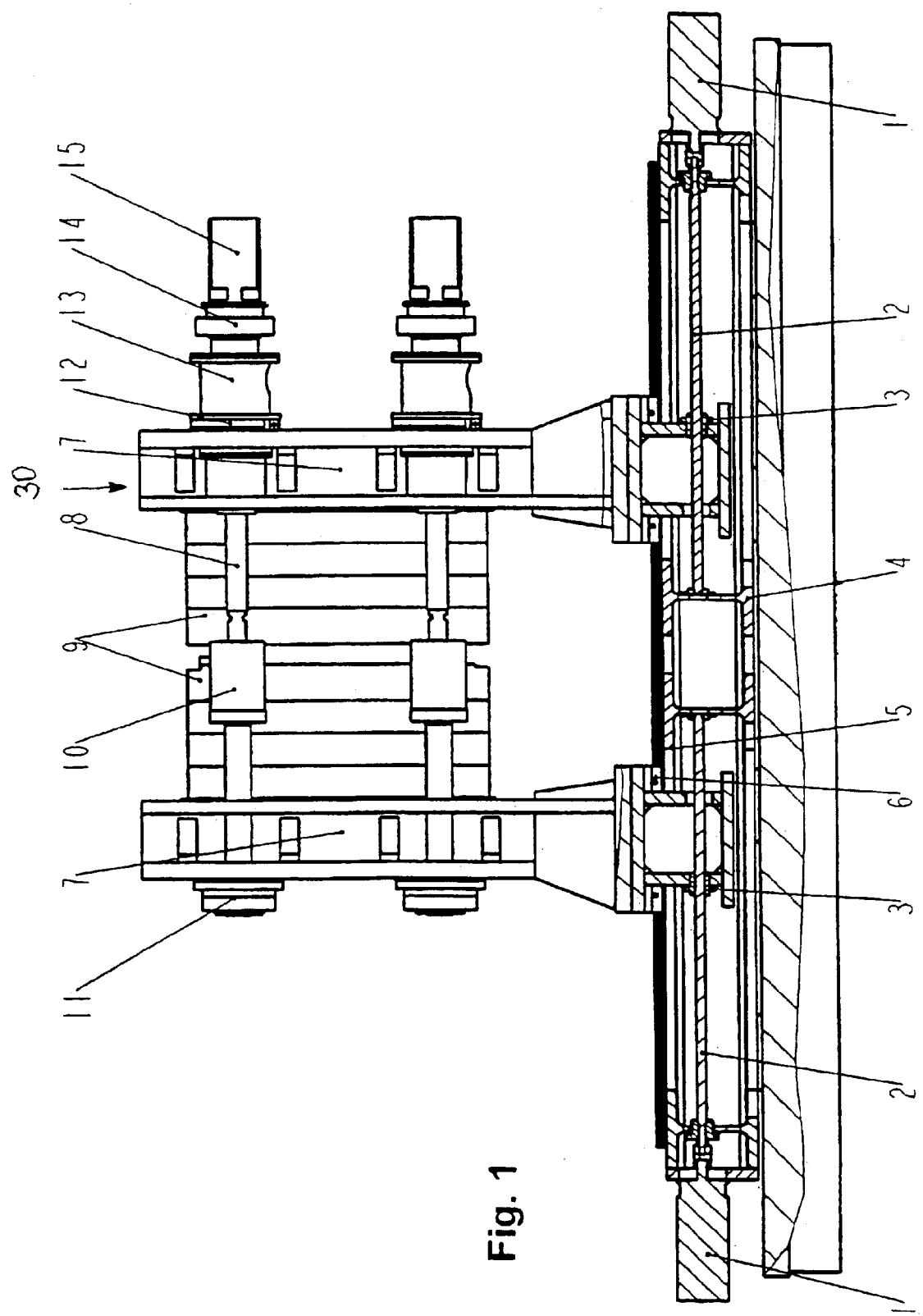
FIG. 1 is a side view of a blow molding machine according to the invention.

Throughout all the Figures, same or corresponding elements are generally indicated by same reference numerals.

Figure 2:
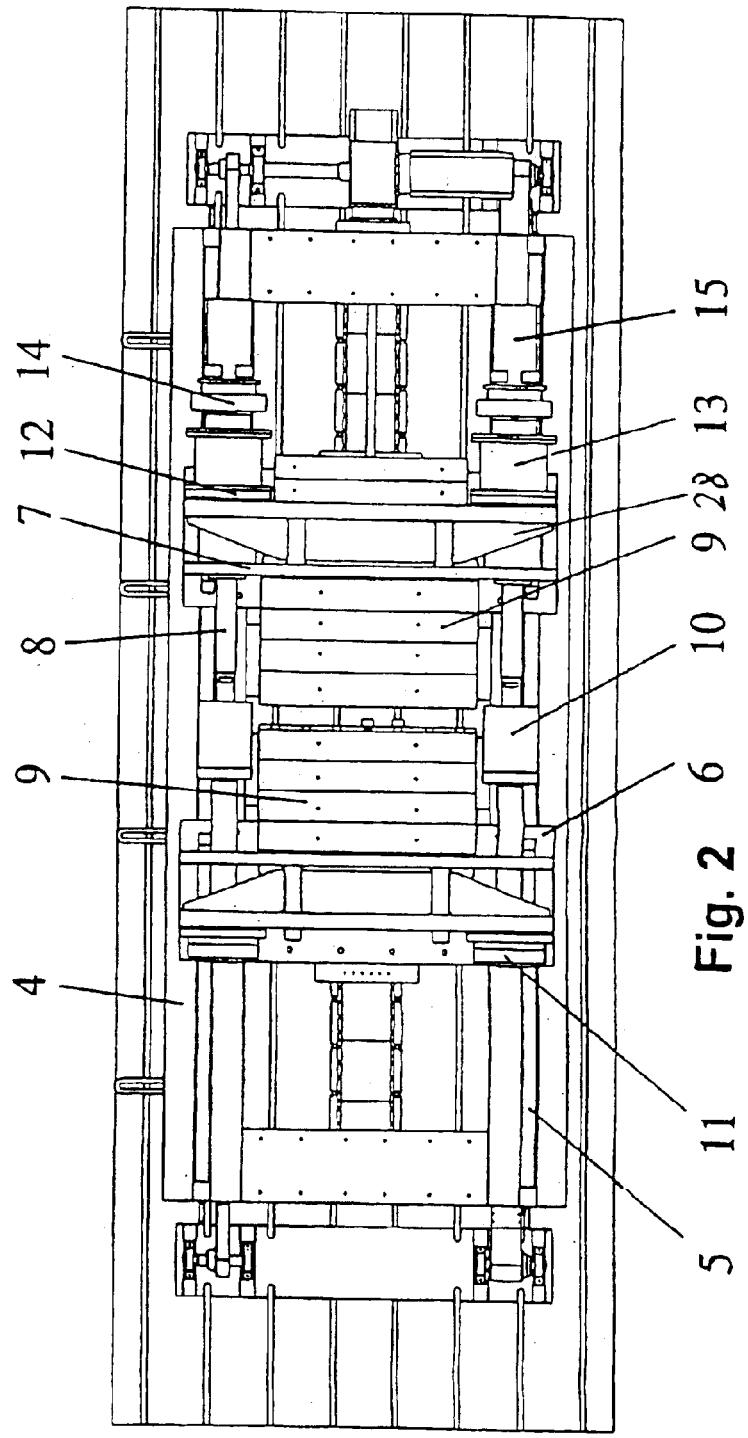
FIG. 2 is a top view of the blow molding machine of FIG. 1.

Turning now to the drawing, and in particular to FIG. 1, there is shown a side view of a blow molding machine according to the invention, including a superstructure, generally designated by reference numeral 30 and comprising the moving parts, and a substructure, generally designated by reference numeral 30 for mounting of the superstructure upon a base frame and four ribbed metal sheets. The superstructure 30 has an active side (right hand side of FIG. 1) and a passive side (left hand side of FIG. 1), each including a mold carrier having two mold mounting plates 7 in parallel relationship. The mold mounting plates 7 of each mold carrier support a mold half 9 and are connected to form a large-area, box-shaped carrier frame (welded construction). The respectively outer ones of the plates 7 (FIG. 2) are hereby configured in rigid manner by horizontal webs 28. The mold carriers travel along a base frame 4 on two recirculating ball guiding lines 5 through operation of a movement drive 1 which drives via a recirculating ball spindle 2 and an attached spindle nut 3 a carriage 6.

Each mold carrier may carry out a stroke of 600 mm in symmetric relationship to the center axis. The connections of all rapid drives to the masses to be moved (mold carriers) are designed in modular construction in order to enable attachment and detachment without requiring substantial need for alignment.

Supported on each mold carrier is a closing unit having two closing elements 8, also called power bars, which engage each of the outer plates 7 in the area of the webs 28. These power bars 8 correspond to the hydraulic piston and cylinder units in conventional blow mold machines of this structural type.

The power bars 8 are suspended uniaxially and cardanically, i.e. axially rigid for force transmission but flexible (angularly elastic) for compensation of angle errors, on the mold mounting plates 7. The active side of the blow molding machine is driven by a trapezoidal threaded spindle and worm gear mechanism, whereas the passive side is not driven, but still elastically suspended. The power bars 8 on the active side interact with releasable coupling elements 10 for purposes of moving both mold halves 9 apart. The power bars 8 are configured of respective stable construction since they have to apply the force for pinch-off and clamping during the blow molding operation.

A closing element or power bar 8 exhibits a particular feature: It is configured as a separate structural unit and thus attachable or detachable in a simple way. The advantage resides in the fact that the power bars 8 can be preassembled at a suitable work place and then installed as a complete assembly unit into the closing frame.

Figure 5:
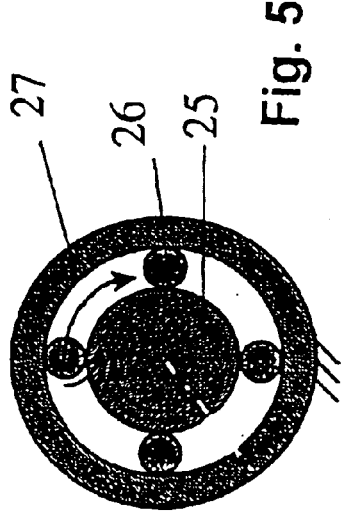
FIG. 5 is a principal illustration of a spindle with recirculating rollers on the active side of the blow molding machine.

A total of four power bars 8 are used in this embodiment to apply the force symmetrically and evenly and to transfer the force via a closed force-tetragon into the mold mounting plates 7. The drive assembly of the closing unit on the active side of the blow mold molding machine is shown in more detail in FIG. 3 and includes for each power bar 8 a transmission 14 with electromotive drive 15, connected via a curved teeth coupling 13 with a spindle nut 19. The driven and thus rotating spindle nut 19 (rotation movement) drives a stationary spindle 18 (translational movement) which is interconnected to the power bar 8 having a pin element 29 for engagement into the coupling cylinder 10 on the passive side. FIG. 5 shows a principal illustration of the electromotive drive 15 in the form of an electric spindle mechanism which includes a shiftable spindle 25 received in a case 27 and supported therein by rollers 26 which spin counterclockwise while revolving around the spindle 25 in a clockwise direction, as the spindle 25 also rotates in clockwise direction. The spindle 25 is operatively connected to the spindle 18 via compensating coupling 16.

As shown in FIG. 4, the coupling cylinder 10 is connected on its end distal to the power bar 8 to a cylinder rod 21 which is floatingly supported by a movable bearing connection 22, e.g. springs, and traverse the mold mounting plate 7. At its end distal to the coupling cylinder 10, the cylinder rod 21 is supported in a axial pivoting bearing shell 23 and axial pivoting bearing ball 24.

The mechanical and electric configuration of the closing unit according to the invention is as follows:

The closing unit operates according to the principle of the separated drive concepts for the movement of the blow mold halves for ejection of an article (quick movement drive) and the pinch-off of the parison (tube) and the clamping of the blow mold halves 9 during blowing (slow closing drive). The movement drive 1 may be implemented by, e.g., a chain drive or belt drive, which are driven by only one motor (preferably electromotor) and therefore permit only symmetric motions. Currently preferred is, however, the use of spindle drives, as shown in FIG. 1, wherein the closing unit is provided, preferably, with two separate spindles for each mounting plate 7, with the spindles having high thread pitch. As a consequence, the mounting plates 7 can travel also asymmetrically. Electric linear motors may, however, also be used as movement drives.

As shown in the non-limiting example of FIG. 1, the blow molding machine includes four power bars 8 and spindles 18. The drive assembly for the closing unit is a compact unit with motor 15, transmission 14, coupling 13, spindle nut 19, spindle 18 and clamping power bar 8, and may be attached or detached as unitary structure, without dismantling, to and from the mold mounting plates. FIG. 2 clearly illustrates again the closing frame construction by way of a top plan view.

The basic configuration of the closing bar 8 for locking and clamping both blow mold halves 9 with one another is shown in FIG. 3 and FIG. 4. The spindle nut 19 is floatingly supported in a bearing ring 12 by springs 17 so that bending stress created by the mold mounting plates 7 or power bars 8 are compensated and not transmitted to the spindle-nut-system to cause premature wear. The spindle 18 and attached power bar 8 are so sized as to be able to absorb a force of about 500 kN (with a clamping force of 2000 kN for the entire system). Servomotors with integrated resolvers are used as electric drives. The resolvers are incremental displacement pickups for the machine control and regulating functions. The signal of the resolvers is also used for positioning the moving parts so that an additional external and conventional displacement measurement can be omitted.

Description of operation of the closing unit during coupling process:

The movement drive 1 moves the mold halves 9 at high velocity (about 0.8 m/s) until a spacing of about 35 mm (approximately twice the tube wall thickness) remains between the mold halves 9. From this point on, the mounting plates 7 continue to travel toward one another at reduced velocity (about 10 mm/s pinch-off). The power bars 8 dip into the coupling cylinders 10. At the same time, the closing drives 15 are accelerated until they have the same velocity as the movement drive 1 or move slightly slower than the movement drive 1, to attain a safe engagement of the bars 8. The coupling cylinders 10 lock hereby the bars 8 by spring force as soon as the bars engage sufficiently far enough. Locking triggers actuation of a limit switch, not shown to provide a signal by which the movement drive 1 is switched torqueless, or, when the movement drive 1 is configured as spindle drive, only one spindle 18 is switched torqueless, so that the other confronting spindle 18 can hold the blow mold halves 9 centrally in the mold parting plane.

Apart from accelerating the closing drives 15 to a same velocity as the movement drive 1, no further particular control is required. A secure locking is realized by the end position play of the coupling cylinders 10, exploited during synchronization. When all coupling cylinders 10 are locked, the movement up to mold closure as well as the force for pinch-off of the plastic tube is implemented only by the electric closing drives. Hereby, the drives 15 are operated positionally controlled until the drives 15 reach a pre-set torque. Thereafter, the speed is reduced to zero while the torque remains constant, wherein the brake engages at the same time. Then, the motors 15 are switched torqueless (force relief) and thus the current in the motor is reduced. As a consequence, no electric energy is required in the drives 15 during blow-molding the article.

At operation, the spring assembly and force storing device brake the blow mold halves 9, when moving toward one another, whereby the tube yields, and realize an advance of the blow mold halves 9 against the expansion tendency by the applied blowing pressure. Shortly before opening the mold halves 9, the control of the torque is cleared again, the brake is disengaged and the mold halves move slowly apart. After relieve of the mounting plates 7 and the power bars 8, the power bars 8 are released from the coupling cylinders 10 by compressed air. The closing drive 15 can be de-synchronized and the movement drive 1 moves the mold halves 9 in rapid motion far apart for article ejection. The complexity of the control-sensory system is hereby comparably slight because the control-sensory system in the electric drives is advantageously integrated directly in the motor itself. Thus, fewer problems arise in conjunction with adjusting the sensory mechanism as well as with construction and maintenance of the machine.

The flexibility of the blow mold machine is characterized i.a. also by a high adaptability for particular demands (e.g. asymmetric blowing position) whereby the modular configuration renders the blow mold machine suitable and retrofittable for symmetric and asymmetric construction with different number of clamping elements (e.g. two, four, six or three, five).

The preceding description of the blow mold machine according to the invention clearly shows the exceptional advantages and the limitless application of a fully electrically driven closing frame. Pre-selected velocity profiles can be provided in a superior manner with a motion dynamic that is suited to the process sequence.

While the invention has been illustrated and described as embodied in a blow molding machine, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and their equivalents:

1. A blow molding machine for making blow-molded hollow bodies of thermoplastic material, comprising:
    a frame structure having two blow mold halves;
    a first drive assembly for moving the blow mold halves in a horizontal direction between an opening position and a closing position;
    a mold closing and locking unit, including at least two clamping elements, for moving and clamping the blow mold halves in the closed position; and
    a second drive assembly for operating the mold closing and locking unit to implement a release and clamping of the blow mold halves, said second drive assembly including two electric direct drives disposed in symmetric relationship laterally next to the blow mold halves, one direct drive operatively connected to one clamping element and the other direct drive operatively connected to the other clamping element.

2. The blow mold machine of claim 1 for making technical blow-molded parts or essentially rotationally asymmetrical hollow bodies, wherein the mold closing and locking unit includes at least three clamping elements, wherein the second drive assembly includes three electric direct drives disposed in asymmetric relationship laterally next to the blow mold halves, a first one of the direct drives operatively connected to a first one of the clamping elements, a second direct drive operatively connected to a second one of the clamping elements, and a third one of the direct drives operatively connected to a third one of the clamping elements.

3. The blow mold machine of claim 1, wherein the mold closing and locking device includes an active half and a passive half which can be coupled approximately in a mold partition plane, wherein the direct drive is disposed on the active half for the mold closing and locking unit and configured as electric spindle drive.

4. The blow mold machine of claim 3, wherein the spindle drive is configured as spindle mechanism with recirculating rollers.

5. The blow mold machine of claim 4, wherein the spindle mechanism with recirculating rollers has a shiftable first spindle, wherein the mold closing and locking unit has a second spindle and a recirculating roller-supported nut mounted on the second spindle and driven in fixed relationship to the second spindle by a motor of the spindle drive.

6. The blow mold machine of claim 4, wherein the spindle mechanism with recirculating rollers includes a non-rotatably supported first spindle, wherein the mold closing and locking unit has a second spindle and a recirculating roller-supported nut mounted on the second spindle and driven by a motor of the spindle drive for displacement along the second spindle.

7. The blow mold machine of claim 1, wherein the mold closing and locking unit has a force storing device which applies a pre-tension in opposition to a blowing pressure, when the blow mold halves are clamped.

8. The blow mold machine of claim 7, wherein the force storing device is formed as a spring element assembly.

9. The blow mold machine of claim 7, wherein the frame structure has mold mounting plates for supporting the mold halves, wherein the force storing device is formed by one of predetermined elastically deformable regions of the mold mounting plates and frame plates disposed therebehind.

10. A blow mold machine for making blow-molded hollow bodies of thermoplastic material, comprising:
    a frame structure having two blow mold halves;
    a first drive assembly for moving the blow mold halves in a horizontal direction between an opening position and a closing position;
    a mold closing and locking unit for clamping the blow mold haves in the closed position; and
    a second drive assembly for operating the mold closing and locking unit to implement a release and clamping of the blow mold halves, said second drive assembly constructed as electromotive direct drive,
    wherein the frame structure has mold mounting plates for supporting the mold halves, wherein the mold closing and locking unit has a spindle and a recirculating roller-supported nut mounted on the spindle and driven by a motor of the electric direct drive, wherein the recirculating roller-supported nut is secured to one of a blow mold half and mold mounting plate, and is elastically supported in such a way that angular misalignments are equalized or compensated.

11. The blow mold machine of claim 3, wherein the frame structure has mold mounting plates for supporting the mold halves, wherein the mold closing and locking unit includes on the passive side a counterpiece for engagement with an opposite clamping element on the active side, wherein the counterpiece is supported elastically by one of blow mold half and mold mounting plate.

12. A blow mold machine for making blow-molded hollow bodies of thermoplastic material, comprising:
    a frame structure having two blow mold halves;
    a first drive assembly for moving the blow mold halves in a horizontal direction between an opening position and a closing position;
    a mold closing and locking unit for clamping the blow mold haves in the closed position; and
    a second drive assembly for operating the mold closing and locking unit to implement a release and clamping of the blow mold halves, said second drive assembly constructed as electromotive direct drive,
    wherein the first drive assembly for closing and opening the blow mold halves is configured as electromotive direct drive.

13. The blow mold machine of claim 12, wherein the electromotive direct drive, is configured with a threaded spindle with high thread pitch.

14. The blow mold machine of claim 1, wherein the electromotive direct drive has incorporated therein a brake, which so engages that the blow mold halves in closed position are pre-tensioned in the absence of a steady energy supply for a force-intensive clamping action.

15. The blow mold machine of claim 14, wherein the brake is a locking brake.

16. The blow mold machine of claim 14, wherein the mold closing and locking unit has a spindle and a recirculating roller-supported nut mounted on the spindle and driven by a motor of the electric direct drive, wherein the brake is disposed in a drive train to the nut-spindle mechanism.

* * * * *